(12) United States Patent
Hoetzel

(10) Patent No.: US 7,224,809 B2
(45) Date of Patent: May 29, 2007

(54) METHOD FOR THE ACOUSTIC LOCALIZATION OF PERSONS IN AN AREA OF DETECTION

(75) Inventor: Juergen Hoetzel, Florstadt (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 10/333,652

(22) PCT Filed: Jun. 21, 2001

(86) PCT No.: PCT/DE01/02292

§ 371 (c)(1),
(2), (4) Date: Oct. 21, 2003

(87) PCT Pub. No.: WO02/08782

PCT Pub. Date: Jan. 31, 2002

(65) Prior Publication Data

US 2004/0052381 A1    Mar. 18, 2004

(30) Foreign Application Priority Data

Jul. 20, 2000 (DE) ............................. 100 35 222

(51) Int. Cl.
H04R 3/00 (2006.01)

(52) U.S. Cl. ........................................ 381/92; 280/735

(58) Field of Classification Search .................. 381/92; 280/735
See application file for complete search history.

(56) References Cited

U.S. PATENT DOCUMENTS

| | | | |
|---|---|---|---|
| 5,890,085 A | 3/1999 | Corrado et al. | |
| 6,748,088 B1 * | 6/2004 | Schaaf | 381/92 |
| 6,795,558 B2 * | 9/2004 | Matsuo | 381/92 |

FOREIGN PATENT DOCUMENTS

| | | |
|---|---|---|
| EP | 0 831 458 | 3/1998 |
| JP | 10 227849 | 8/1998 |
| JP | 11 041577 | 2/1999 |
| JP | 11 304906 | 11/1999 |
| JP | 2000 193752 | 7/2000 |

* cited by examiner

*Primary Examiner*—Brian T. Pendleton
(74) *Attorney, Agent, or Firm*—Kenyon & Kenyon LLP

(57) ABSTRACT

A method of acoustic localization of persons in a detection space by using sound-emitting elements and sound pick-up elements by emitting acoustic signals into the detection space and measuring the reflected acoustic signals has the steps: measurement of acoustic signals in the frequency range of human speech using a plurality of sound pick-up elements; determination of the skew between the acoustic signals measured at the sound pick-up elements; calculation of the position of the sound source from the skew and the positions of the sound pick-up elements.

2 Claims, 1 Drawing Sheet

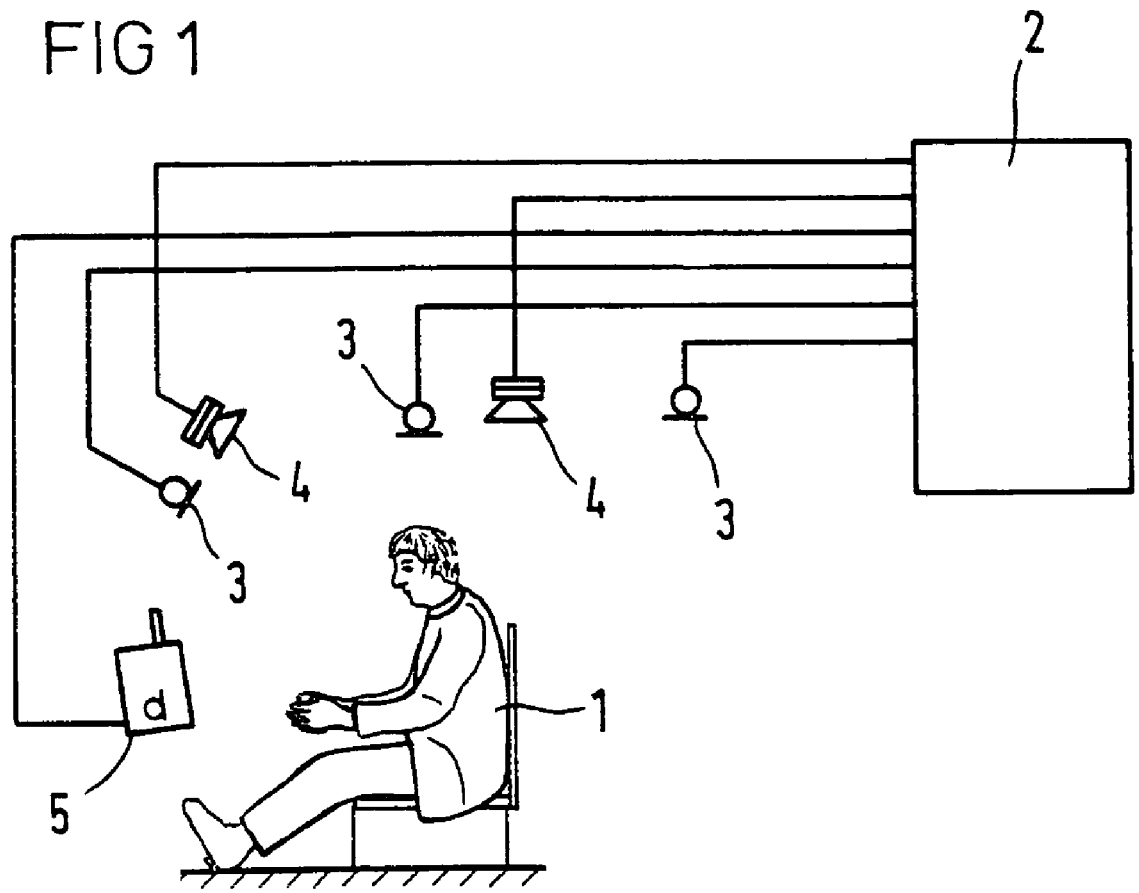

METHOD FOR THE ACOUSTIC LOCALIZATION OF PERSONS IN AN AREA OF DETECTION

FIELD OF THE INVENTION

The present invention relates to a method of acoustic localization of persons in a detection space by using sound-emitting elements and sound pick-up elements by emitting acoustic signals into the detection space and measuring the reflected acoustic signals.

BACKGROUND INFORMATION

There are known out-of-position systems (OOP systems) with which the position of persons, child seats or unoccupied seats is for airbag control in motor vehicles. To this end, sensors, e.g., ultrasonic sensors, infrared sensors, capacitive sensors, or microwave sensors, are distributed throughout the passenger compartment. To be able to activate an airbag in an emergency, if necessary, as a function of the person or object situated in front of the airbag or to disable it completely, e.g., when a child seat is installed in front of the airbag, the occupancy of the passenger compartment is monitored dynamically with the help of the sensors during an entire trip.

In particular, there are known OOP systems in which ultrasonic sensors are acted upon by pulse-like frequencies in the inaudible range in pulse-echo operation, and the echo is determined in the transmission pauses. The occupancy of the passenger compartment can be deduced from the time delay of the echo and the received signal amplitude. Electrically prestressed film membranes which are energized with an ultrasonic frequency in the inaudible range are used as the sound-emitting elements and sound pick-up elements of these ultrasonic sensors. Low-frequency components of the sound pick-ups, in particular in the audible range, are attenuated by electronic filters in the controller of the OOP system for further analysis, because these low frequency components are unambiguous interference signals for pulse-echo operation and do not contain any information about the echo. A plurality of such ultrasonic sensors having film membranes in a housing having a defined relative spacing of ultrasonic sensors will be used for monitoring an entire detection space.

SUMMARY OF THE INVENTION

An object of the present invention is to create a method of acoustic localization of persons in a detection space to improve the reliability, accuracy, and quality of the position recognition of traditional OOP systems.

This object is achieved by the following steps:
 measurement of acoustic signals in the frequency range of human speech using a plurality of sound pick-up elements;
 determination of the skew between the acoustic signals measured at the sound pick-up elements, and
 calculation of the position of the sound source from the skew and the positions of the sound pick-up elements.

It is thus proposed here that audible speech signals also be analyzed and that positions of sound sources be determined. In contrast with this, in traditional OOP systems, audible acoustic signals have been filtered out intentionally because they are strictly interference in the known position determining method of pulse-echo operation.

The positions of sound sources may be determined to advantage by correlation of the measured audible acoustic signals. Sufficiently well-known correlation methods of digital signal processing such as those known from pattern recognition methods may be used here.

It is especially advantageous to determine the spatial relocation of the sound sources thus determined and to filter out positionally stable sound sources. This eliminates information about the positions of positionally stable sound sources, which is irrelevant for airbag control.

To increase the accuracy of the method, however, it is advisable to superimpose the positions of positionally stable and non-positionally stable sound sources.

Audible acoustic signals of positionally stable sound sources may also be used in a known manner for calibration of the system for implementation of this method.

Additionally, the microphone of a hands-free system of a cellular telephone may be used as an extra sound pick-up element. As the sound-emitting elements, the loudspeakers of a car radio may be used in addition to the existing transformers of the OOP system. In this way, the existing OOP system together with additional installations that are also present may be implemented without any great additional installation expense.

BRIEF DESCRIPTION OF THE DRAWINGS

The FIGURE shows a system for acoustic localization of positions according to the present invention.

DETAILED DESCRIPTION

Traditional OOP systems for determining the position of persons, child seats, or unoccupied seats in motor vehicles for the purpose of airbag control have a plurality of sensors such as ultrasonic sensors, which are distributed throughout the passenger compartment of the motor vehicle. Signals are emitted into the passenger compartment, and reflected signals are measured and may be used to deduce the position of persons or objects. These signals may have different wavelength ranges such as ultrasonic, infrared, microwave, or the like. In addition, momentary-contact control switches or weight sensors may also be incorporated into the vehicle seats so that, in the event a vehicle seat is not occupied, the airbags responsible for that vehicle seat may be deactivated.

According to the system of the FIGURE, in addition to measuring and analyzing reflections, acoustic signals in the audible range are now also analyzed. Since acoustic signals propagate in air at a finite and known velocity, the position of the sound source may be deduced from the signal shift of an acoustic signal of the same sound source measured at different locations. This is accomplished by using the known means of digital signal processing by correlation of the measured acoustic signals of the various sound pick-up elements, taking into account the known and fixed positions of the sound pick-up elements. When considered over a period of time, some of the sound sources are positionally stable, while other sound sources change their position. The stationary positions thus determined may be used to refine the delineation of the boundaries of the detection space. However, these stationary sound sources may also be ignored. Irrelevant sources such as loudspeakers in the door panels and vibrating elements may be eliminated by limiting the detection space. An OOP system may also be calibrated with the assistance of the stationary positions thus determined. In addition, the system may be calibrated by using existing signal sources such as the car radio loudspeakers. If the positions of the loudspeakers are known, and if at least four sound pick-up elements are receiving the signals of the loudspeakers, the sound pick-up elements are able to calibrate each other, because at least three sound pick-up elements are always available for calibration. Otherwise, the transmission point in time of the acoustic signals is also used as additional information, so an electric connection to the loudspeakers is used.

Other instrument units may also be used as sound pick-up elements, e.g., the microphones of a hands-free system for cellular telephones. Either the known position of the microphone may be used for correlation of the measured acoustic signals or the position may in a known manner with the help of the loudspeakers at various locations even during an automatic calibration procedure.

What is claimed is:

1. A method of performing an acoustic localization of a person in a detection space in accordance with sound-emitting elements and sound pick-up elements, comprising:

emitting acoustic signals into the detection space;

measuring the acoustic signals after being reflected in order to produce measured acoustic signals, the acoustic signals being in a frequency range of human speech and being measured using the sound pick-up elements;

determining a skew between each acoustic signal measured at the sound pick-up elements;

calculating positions of sound sources from the skew and positions of the sound pick-up elements;

determining a spatial relocation of the sound sources; and filtering out those of the sound sources that are positionally stable;

wherein the sound-emitting elements include loudspeakers of a car radio, and wherein the method is for use in a motor vehicle for airbag control.

2. A method of performing an acoustic localization of a person in a detection space in accordance with sound-emitting elements and sound pick-up elements, comprising:

emitting acoustic signals into the detection space;

measuring the acoustic signals after being reflected in order to produce measured acoustic signals, the acoustic signals being in a frequency range of human speech and being measured using the sound pick-up elements;

determining a skew between each acoustic signal measured at the sound pick-up elements;

calculating positions of sound sources from the skew and positions of the sound pick-up elements;

determining a spatial relocation of the sound sources; and filtering out those of the sound sources that are positionally stable;

wherein one of the sound-pick up elements includes a microphone of a hands-free system for a cellular telephone, and wherein the method is for use in a motor vehicle for airbag control.

* * * * *